United States Patent
Tamagawa et al.

(10) Patent No.: US 9,238,493 B2
(45) Date of Patent: Jan. 19, 2016

(54) METHOD OF INSTALLING INSTRUMENT PANEL MODULE TO VEHICLE

(71) Applicant: MAZDA MOTOR CORPORATION, Hiroshima (JP)

(72) Inventors: Hiroyuki Tamagawa, Hiroshima (JP); Hironobu Morita, Aki-gun (JP); Makoto Shimoda, Hiroshima (JP); Noriyuki Kawamoto, Aki-gun (JP); Yuki Itoh, Hiroshima (JP); Shunsuke Nobuoka, Hiroshima (JP); Kazuhiro Tanaka, Hiroshima (JP); Takayuki Furukawa, Hiroshima (JP); Takashi Shimizu, Aki-gun (JP); Motonori Moriwaki, Higashihiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 109 days.

(21) Appl. No.: 13/956,047

(22) Filed: Jul. 31, 2013

(65) Prior Publication Data

US 2013/0312242 A1 Nov. 28, 2013

Related U.S. Application Data

(63) Continuation of application No. PCT/JP2012/000581, filed on Jan. 30, 2012.

(30) Foreign Application Priority Data

Feb. 3, 2011 (JP) .................................. 2011-021734

(51) Int. Cl.
*B62D 65/14* (2006.01)
*B62D 25/14* (2006.01)
*B60K 37/00* (2006.01)

(52) U.S. Cl.
CPC ................ *B62D 65/14* (2013.01); *B60K 37/00* (2013.01); *B62D 25/147* (2013.01); *B60K 2350/943* (2013.01); *Y10T 29/49895* (2015.01)

(58) Field of Classification Search
CPC ...... B62D 25/147; B62D 65/14; B60K 37/00; B60K 2350/943; Y10T 29/49895
USPC ........ 29/822, 783, 791, 281.4, 464, 466, 468, 29/271, 281.5; 296/70
See application file for complete search history.

(56) References Cited

U.S. PATENT DOCUMENTS 4,594,764 A * 6/1986 Yamamoto ...................... 29/430
4,876,786 A * 10/1989 Yamamoto et al. ............. 29/429

(Continued)

FOREIGN PATENT DOCUMENTS

| DE | 10029414 A1 | 2/2001 |
|---|---|---|
| JP | 06-087476 A | 3/1994 |
| JP | 3698092 B2 | 9/2005 |

OTHER PUBLICATIONS

International Search Report; PCT/JP2012/000581; Apr. 17, 2012.

(Continued)

*Primary Examiner* — Christopher M Koehler
(74) *Attorney, Agent, or Firm* — Studebaker & Brackett PC

(57) ABSTRACT

Provided is a method which comprises: an attaching step of attaching a pair of installation jigs, respectively, to right and left opposite lateral portions of a support member; a clamping step of clamping the clampable surface portion of each of the installation jigs by a clamping unit of a transfer device; a temporarily mounting step of transferring the instrument panel module to the front of the passenger compartment by the transfer device to temporarily mount each of the right and left mounting brackets to a sidewall of a vehicle body; and a fastening step of, after the temporarily mounting step, detaching the installation jigs from the support member, and fastening each of the right and left mounting brackets to the sidewall of the vehicle body in the vehicle width direction by a fastening bolt.

16 Claims, 12 Drawing Sheets

(56) References Cited

U.S. PATENT DOCUMENTS

| | | | |
|---|---|---|---|
| 5,311,659 A * | 5/1994 | Barnhart et al. | 29/823 |
| 5,456,002 A * | 10/1995 | Barnhart et al. | 29/787 |
| 5,477,603 A * | 12/1995 | Kemichick | 29/468 |
| 6,481,077 B1 * | 11/2002 | Matsumoto et al. | 29/271 |
| 6,895,647 B2 * | 5/2005 | Matsumoto et al. | 29/281.4 |
| 2002/0157234 A1 * | 10/2002 | Sawada et al. | 29/464 |
| 2005/0144770 A1 | 7/2005 | Sawada et al. | |
| 2007/0114709 A1 | 5/2007 | Sawada et al. | |
| 2010/0319182 A1 * | 12/2010 | Sugimoto et al. | 29/428 |

OTHER PUBLICATIONS

The First Office Action issued by the State Intellectual Property Office of People's Republic of China on Feb. 28, 2015, which corresponds to Chinese Patent Application No. 201280006020.9 and is related to U.S. Appl. No. 13/956,047; with English language summary.

* cited by examiner

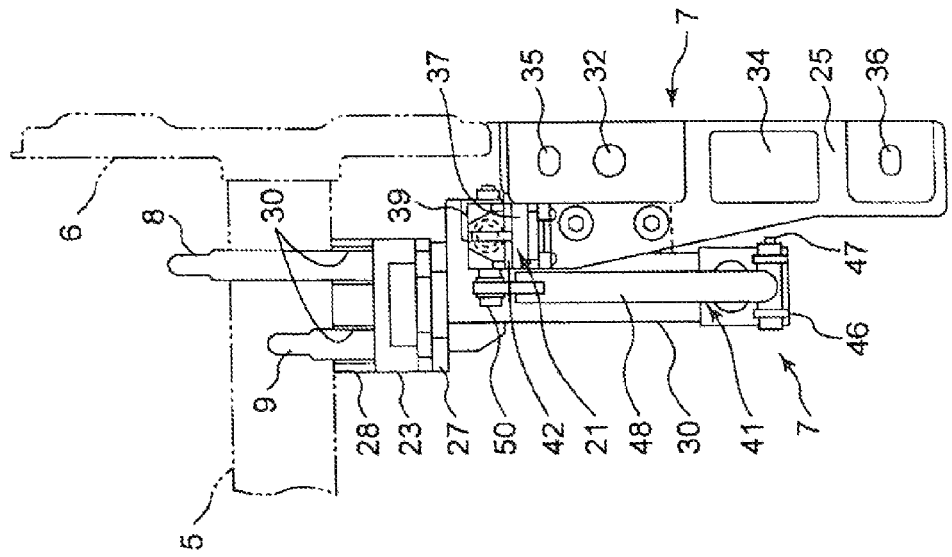
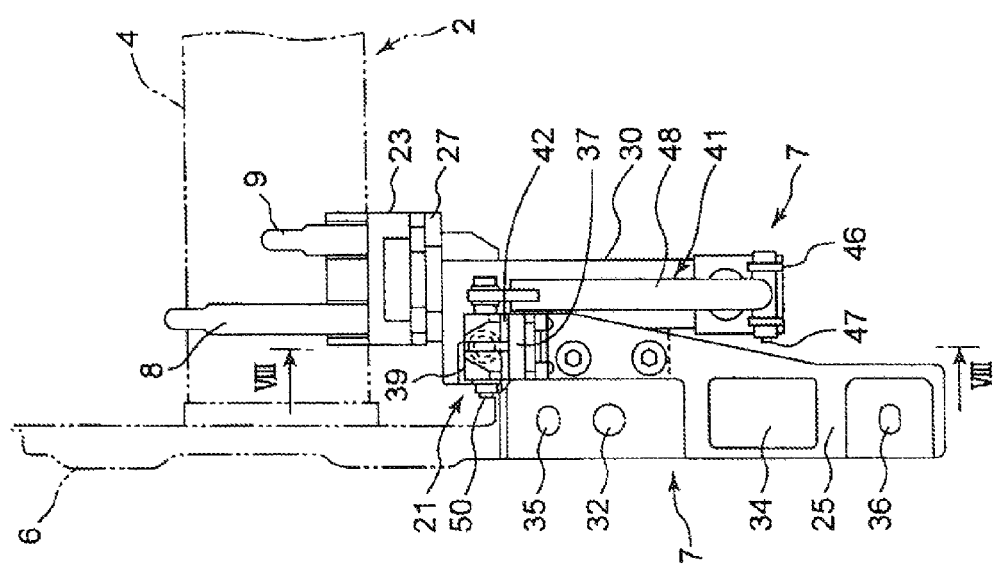
FIG.6

METHOD OF INSTALLING INSTRUMENT PANEL MODULE TO VEHICLE

TECHNICAL FIELD

The present invention relates to a vehicle instrument panel module installation method for installing, to a front of a passenger compartment of a vehicle, an instrument panel module comprising a combination of a support member extending in a vehicle width direction and a dashboard.

BACKGROUND ART

Heretofore, in an operation for installing an instrument panel module (cockpit module) prepared by assembling various components around a support member (steering support member), to a dash member or the like of a vehicle body, it has been known to detachably attach two holding brackets, respectively, to opposite ends of the support member in such a manner that each of the holding brackets is disposed to be exposed beyond a front door opening edge of the vehicle body in a vehicle width direction when the instrument panel module is installed to the dash member of the vehicle body, and install the instrument panel module to the vehicle body while holding the holdable portion from an outside thereof in the vehicle width direction by the installation jig, as disclosed in the following Patent Literature.

LIST OF PRIOR ART DOCUMENTS

Patent Literature

PTL1: JP 3698092 B

SUMMARY OF INVENTION

Technical Problem

In the vehicle instrument panel module installation method disclosed in the PTL1, even in a structure where a part of the instrument panel module is not exposed beyond the front door opening edge in side view, the holding brackets can be disposed beyond the front door opening edge in the vehicle rear direction, so that it becomes possible to install the instrument panel module to a front of a passenger compartment while holding the instrument panel module without using a handling apparatus such as a robot or an assist unit.

However, the above vehicle instrument panel module installation method has a problem that it is necessary to form two openings or the like in a dashboard at respective positions on right and left opposite sides of the passenger compartment to allow the holding brackets to protrude through the dashboard in the vehicle rear direction, and the openings or the like have to be covered, for example, by a cover member, after detaching the holding brackets from the dashboard.

In view of the above problem, it is an object of the present invention to provide a vehicle instrument panel module installation method capable of allowing an operation for installing, to a front of a passenger compartment of a vehicle, an instrument panel module comprising a combination of a support member extending in a vehicle width direction and a dashboard, to be performed easily and adequately without employing a means to form openings in the dashboard, etc.

Solution to Problem

In order to achieve the above object, according to one aspect of the present invention, there is provided a vehicle instrument panel module installation method for installing, to a front of a passenger compartment of a vehicle, an instrument panel module comprising a combination of a support member extending in a vehicle width direction and a dashboard. The method has the following feature.

The method comprises: an attaching step of attaching a pair of installation jigs, respectively, to right and left opposite lateral portions of the support member, wherein: the support member has right and left mounting brackets provided, respectively, at right and left opposite ends thereof, and right and left positioning holes each formed at a position located on the side of a bottom thereof and inward of a respective one of the right and left mounting brackets in the vehicle width direction; and each of the installation jigs comprises an upwardly-extending pin adapted to be inserted into a corresponding one of the right and left positioning holes, a receiving seat for the support member, and a clampable surface portion facing in a vehicle front-rear direction; a clamping step of clamping the clampable surface portion of each of the installation jigs by a transfer device having a clamping unit; a temporarily mounting step of transferring the instrument panel module to the front of the passenger compartment by the transfer device to temporarily mount each of the right and left mounting brackets to a sidewall of a vehicle body; and a fastening step of, after the temporarily mounting step, detaching the installation jigs from the support member, and fastening each of the right and left mounting brackets to the sidewall of the vehicle body in the vehicle width direction by a fastening bolt.

The method of the present invention makes it possible to perform an operation for carrying the instrument panel module in the passenger compartment using the transfer device, temporarily mounting each of the right and left mounting brackets to the sidewall of the vehicle body, etc., while clamping the clampable surface portion of each of the installation jigs by the transfer device, easily and adequately without employing a conventional means, for example, configured such that a clampable portion to be clamped by a clamping unit of the transfer device is provided to protrude in a vehicle rear direction through an opening formed in a dashboard.

BRIEF DESCRIPTION OF THE DRAWINGS

FIG. 6 is a back view illustrating a specific configuration of an installation jig.

DESCRIPTION OF EMBODIMENTS

Figure 1:
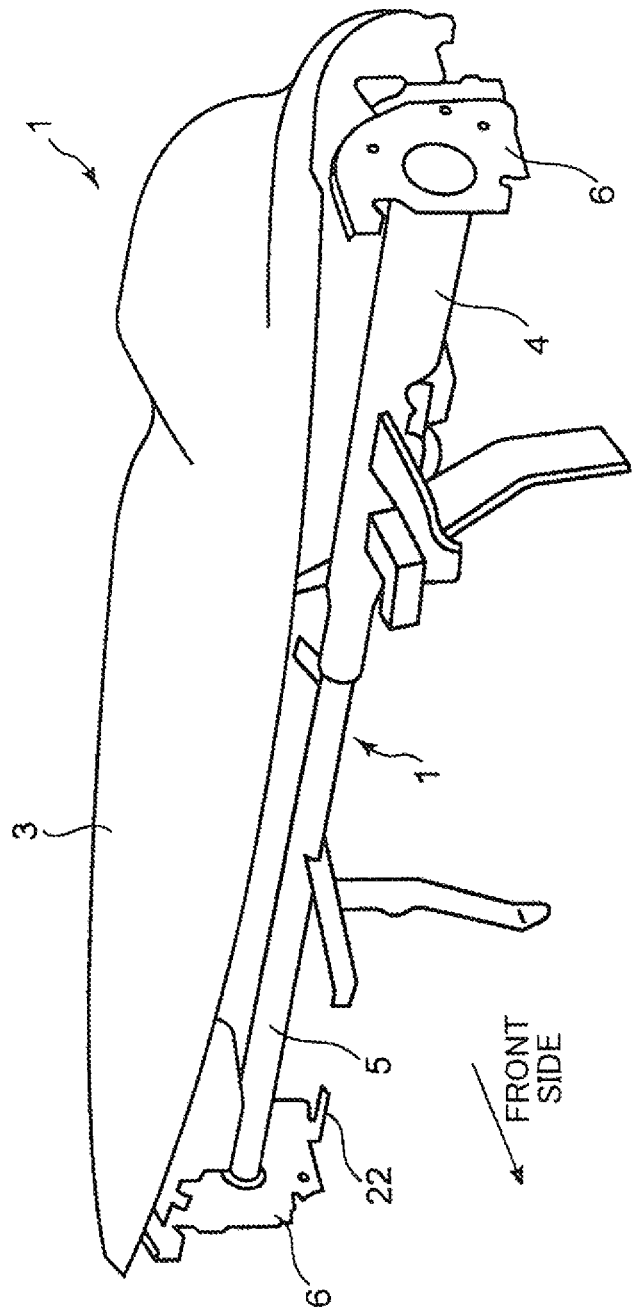
FIG. 1 is a perspective view illustrating a specific configuration of an instrument panel module.
Figure 2:
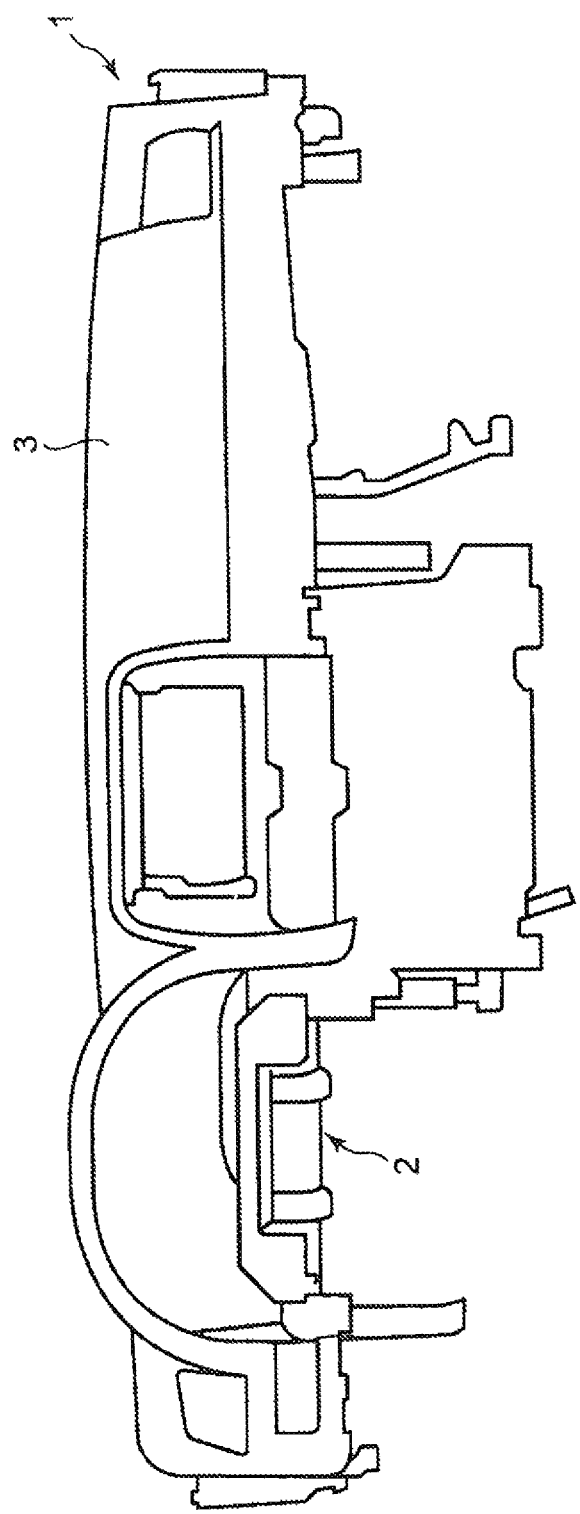
FIG. 2 is a back view illustrating the specific configuration of the instrument panel module.
Figure 3:
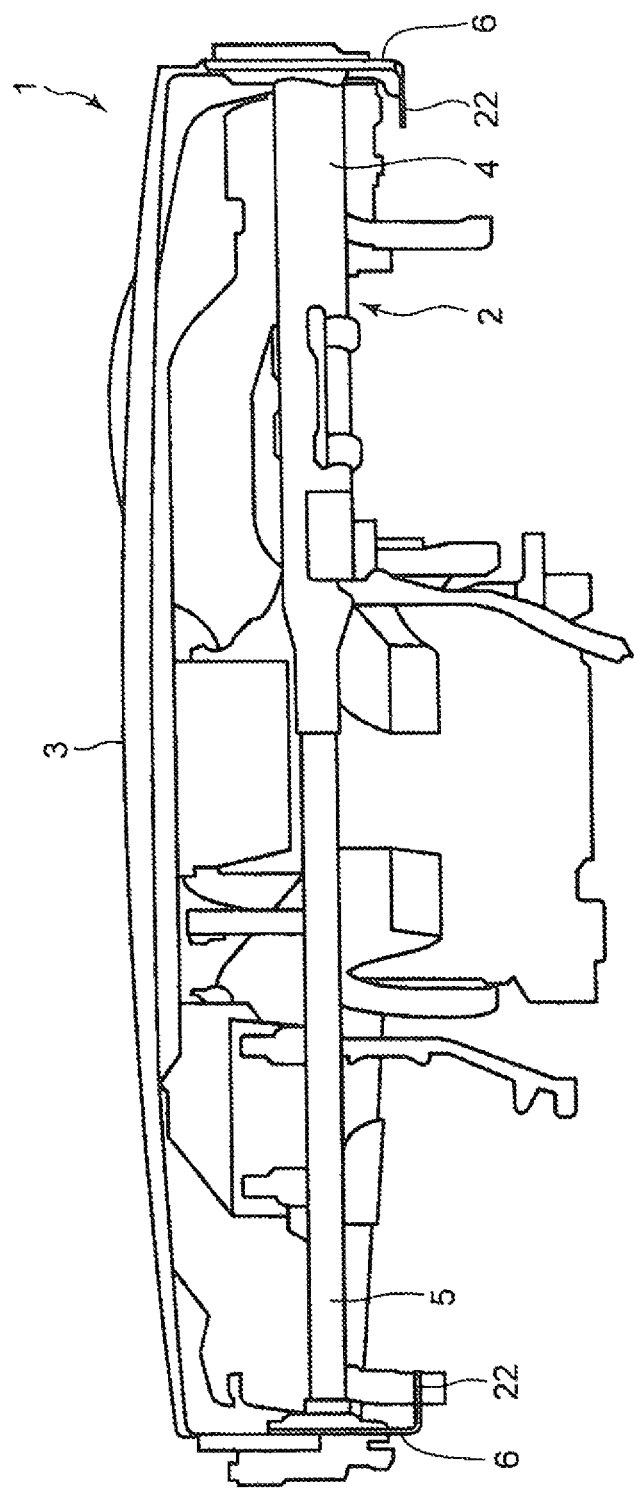
FIG. 3 is a front view illustrating the specific configuration of the instrument panel module.

FIGS. 1 to 3 illustrate an instrument panel module 1 to be installed to a front of a passenger compartment of a vehicle by a vehicle instrument panel module installation method according to the present invention. The instrument panel module 1 comprises a combination of: a support member 2 having right and left opposite ends each of which is to be fixed to a sidewall of a vehicle body composed of a base end portion of a hinge pillar and others, and a dashboard 3.

The support member 2 of the instrument panel module 1 comprises a first tubular body 4 composed of a large-diameter pipe and located on the side of a driver seat, a second tubular body 5 composed of a small-diameter pipe integrally coupled to the first tubular body 4 and located on the side of a front passenger seat, and right and left mounting brackets 6 fixed, respectively, to right and left opposite ends of the integral first and second tubular bodies 4, 5.

The instrument panel module 1 is further provided with a mounting member supporting the dashboard 3, a stay member for supporting the support member 2 with respect to a floor of the vehicle, a steering shaft supporting portion, and an air-conditioning duct.

Figure 4:
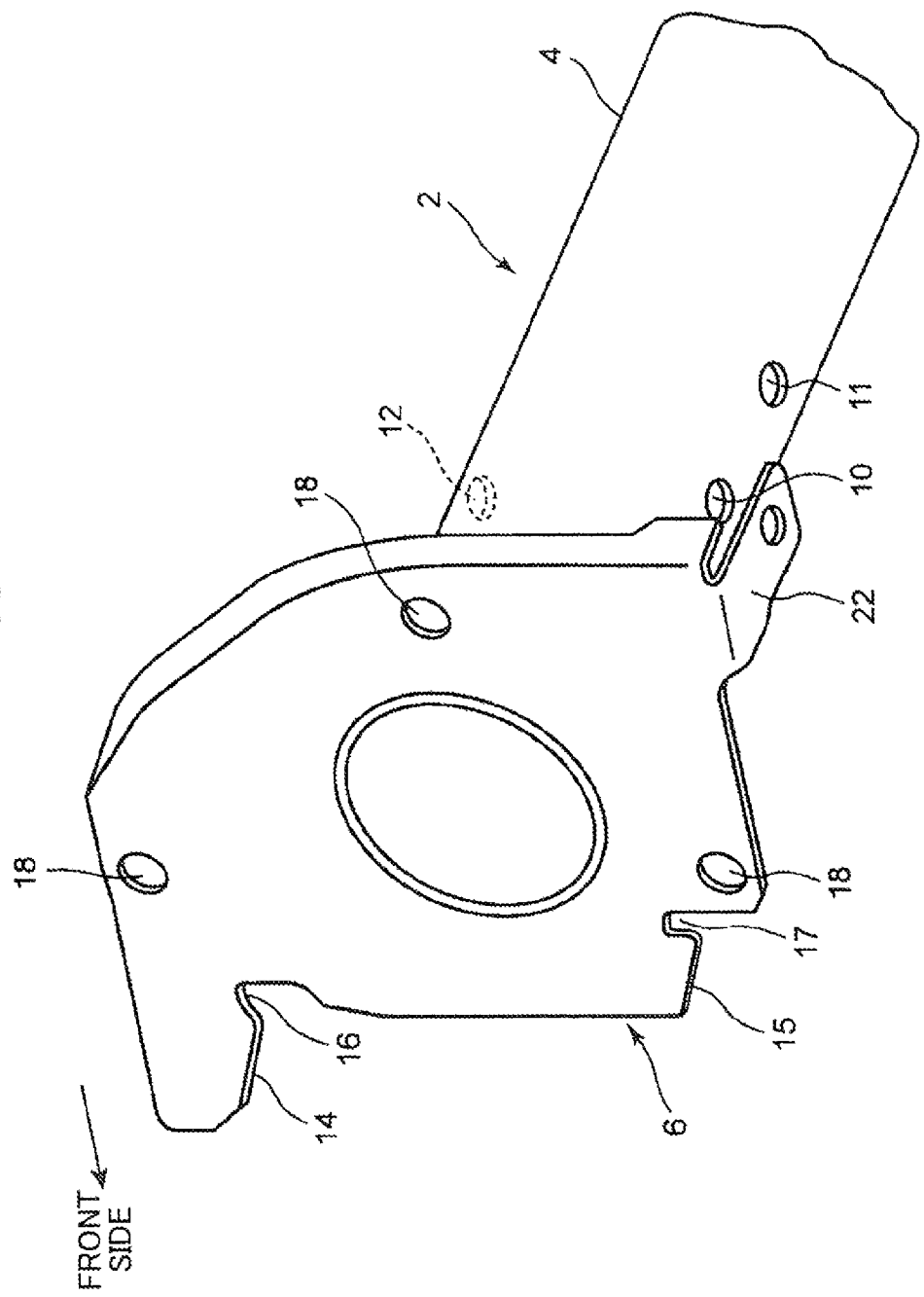
FIG. 4 is a perspective view illustrating a specific configuration of a support member.
Figure 5:
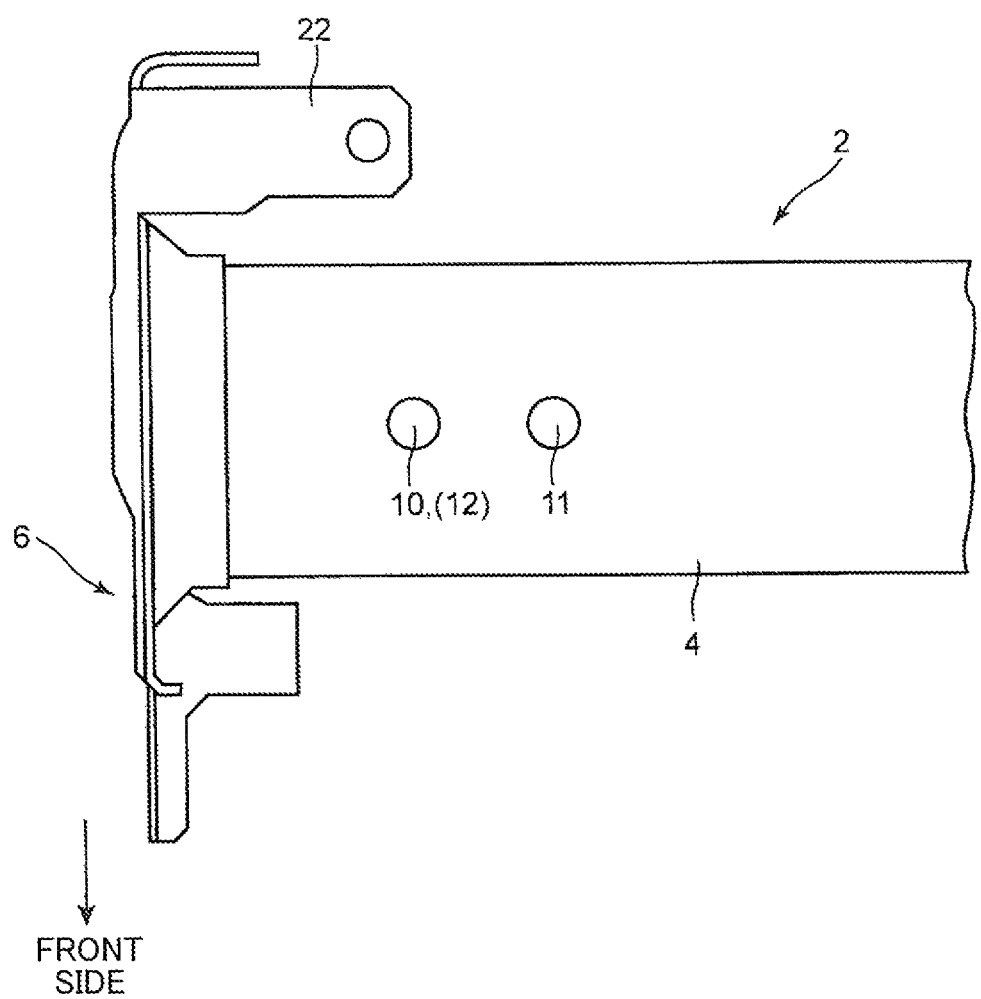
FIG. 5 is a bottom view illustrating the specific configuration of the support member.

As illustrated in FIGS. 4 and 5, two positioning holes 10, 11 are formed in each of right and left opposite lateral portions of the support member 2. Specifically, the two positioning holes 10, 11 are formed on the side of a bottom of each of the first and second tubular bodies 4, 5, and located in a region inward of a respective one of the right and left mounting brackets 6 in a vehicle width direction by a predetermined distance and with a given distance therebetween, in such a manner as to allow upward-extending pins 8, 9 (see FIG. 6) provided on an aftermentioned installation jig 7 to be inserted into respective ones thereof.

Further, a positioning hole 12 is formed on the side of a top of each of the right and left lateral portions of the support member 2, to allow an upper end of one of the two pins 8, 9 located on an outward side in the vehicle width direction to be inserted thereinto.

Each of the right and left mounting brackets 6 of the support member 2 is composed of a plate-shaped member which is welded to a respective one of the ends of the integral first and second tubular bodies 4, 5, in such a manner that it is located to face the sidewall of the vehicle body.

The mounting bracket 6 has a front edge formed with: upper and lower guide surfaces 14, 15 each inclined obliquely upwardly and frontwardly and adapted to be slidingly moved along a respective one of two support pins 67, 68 (see FIG. 11) protruding from the sidewall of the vehicle body inwardly in the vehicle width direction, in an aftermentioned temporarily mounting step; and upper and lower locking grooves 16, 17 each formed at a base end of a respective one of the upper and lower guide surfaces 14, 15 as an upward concave portion. The term "upward concave portion" here means a configuration similar to grooves illustrating in FIG. 11.

The mounting bracket 6 has a plurality of bolt-insertion holes 18 formed at respective positions of an outer peripheral portion thereof and each adapted to allow a fastening bolt 69 (see FIG. 12) for fixing the support member 2 to the sidewall of the vehicle body in a fastening step to be inserted thereinto.

Figure 8:
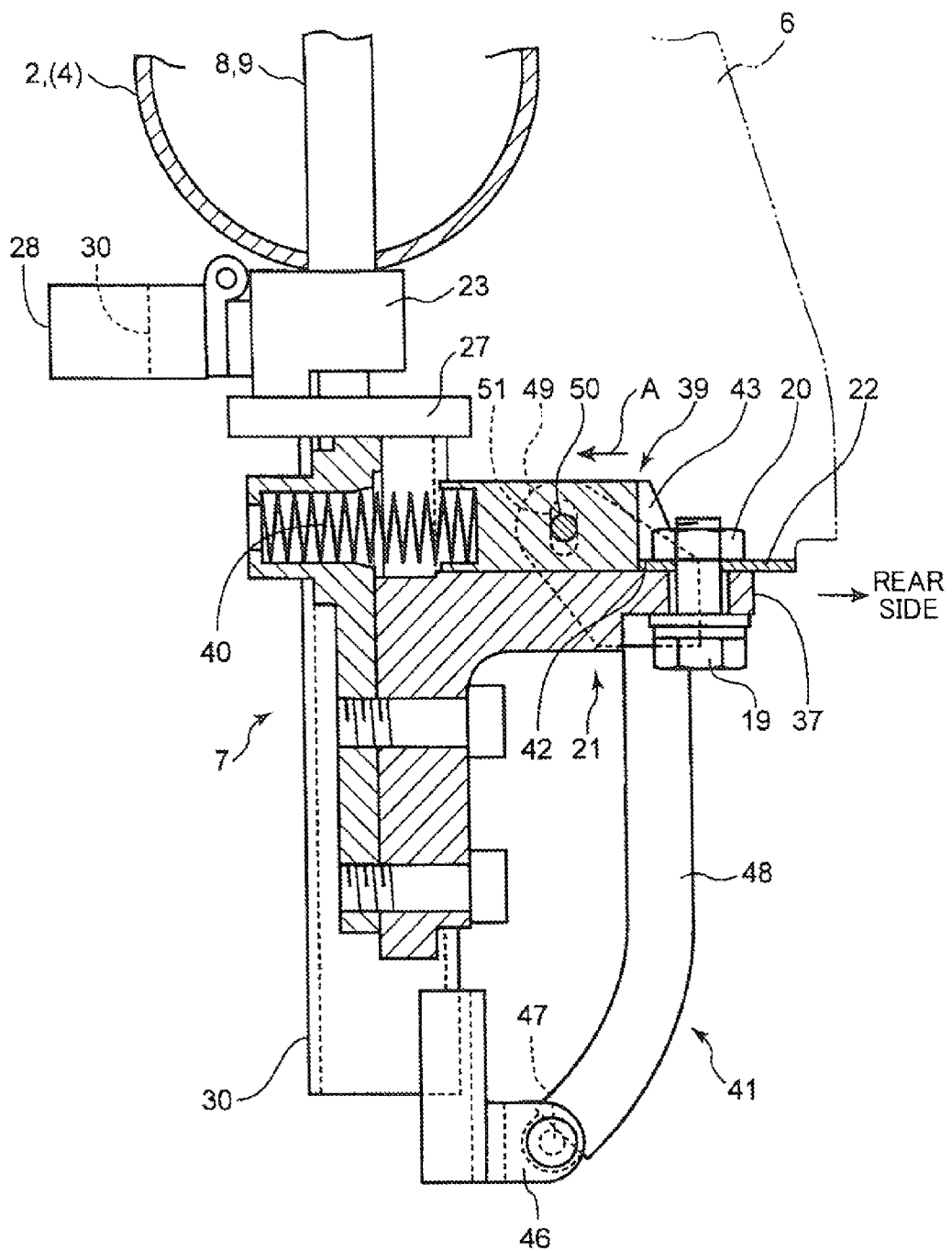
FIG. 8 is a vertical sectional view taken along the line VIII-VIII in FIG. 6.

Further, the mounting bracket 6 has a fixable plate 22 which is provided at a position on a rear side of a lower edge thereof, i.e., at a position on the side of a rear end of the vehicle in an installed state of the support member 2 (hereinafter referred to simply as "rear side") to protrude inwardly in the vehicle width direction (toward a longitudinally central portion of the support member 2), and adapted to allow a fixing base 21 of an installation jig 7 to be fixed thereto by a fixing bolt 19 and a nut 20, as illustrated in FIG. 8.

Figure 7:
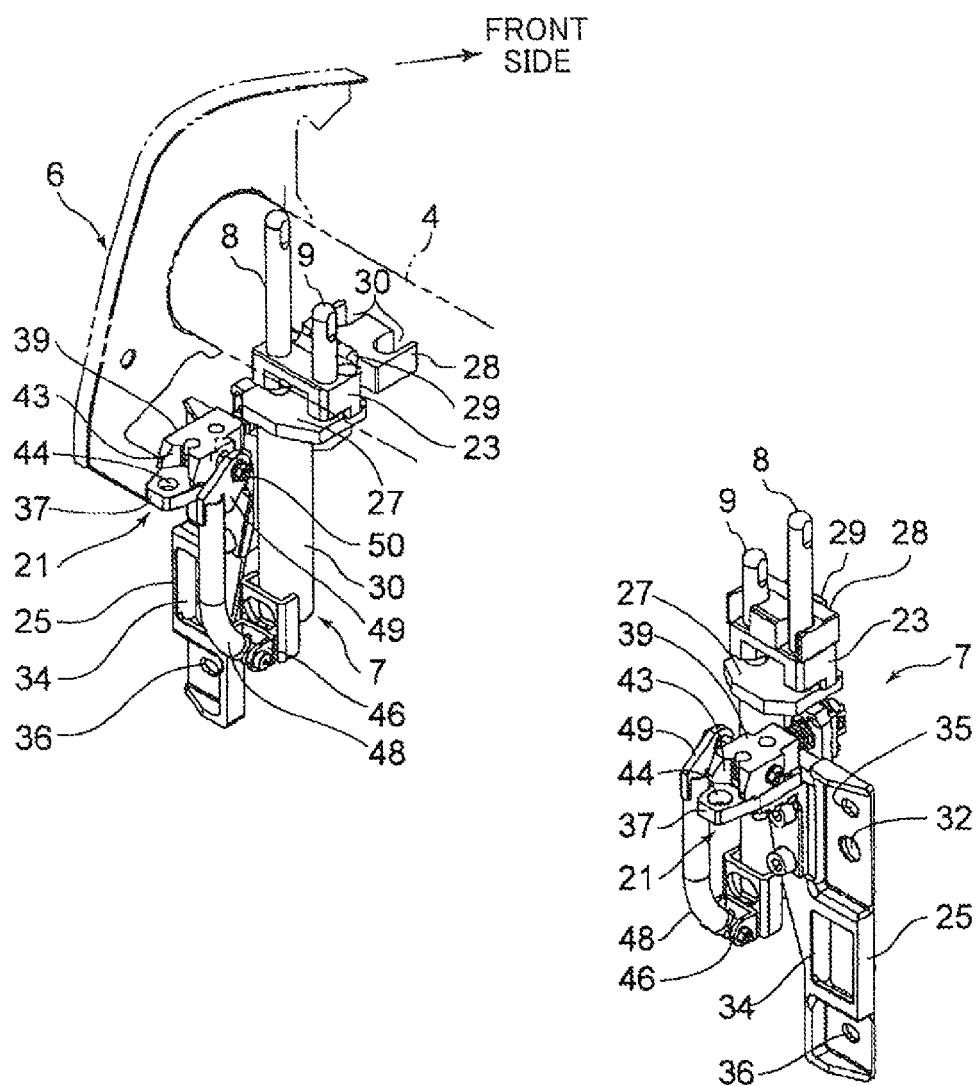
FIG. 7 is a perspective view illustrating the specific configuration of the installation jig.

As illustrated in FIGS. 6 to 8, the installation jig 7 comprises: two pins 8, 9 adapted to be inserted into respective ones of the positioning holes 10 (12), 11 of the support member 2; a receiving seat 23 located at lower ends of the pins 8, 9; a clampable surface portion 25 adapted to be clamped by a clamping unit 33 (see FIG. 9) of a transfer device 24 for transferring the instrument panel module 1; and the fixing base 21 adapted to be fixed to the fixable plate 22 provided in the mounting bracket 6 of the support member 2.

The receiving seat 23 of the installation jig 7 is a block-like body fixed on an upper surface of a support plate 27 located to extend horizontally. The two pins 8, 9 consist of a relatively long first pin 8 and a relatively short second pin 9 which are provided on an upper surface of the receiving seat 23 to protrude upwardly and arranged side-by-side in a right-left (vehicle width) direction with a given distance therebetween.

A spacer 28 is connected to a rear wall surface of the receiving seat 23 through a hinge bracket 29. The spacer 28 has a thickness corresponding to ½ of a difference in diameter between the first and second tubular bodies 4, 5 constituting the support member 2, and is adapted to be swingably displaced between a first position where it is folded and superimposed on the receiving seat 23 as illustrated in a right installation jig 7 located on the right side of FIGS. 6 and 7 (on the side of a front passenger seat), and a second position where it is unfolded rearwardly as illustrated in a left installation jig 7 located on the left side of FIGS. 6 and 7 (on the side of a driver seat), so as to allow the installation jig 7 to be used for both a left-hand drive vehicle (vehicle with a left-hand steering wheel) and a right-hand drive vehicle (vehicle with a right-hand steering wheel). The spacer 28 is formed with two cutouts 30, 30 for avoiding interference with the first and second pins 8, 9 when the spacer 28 is superimposed on the receiving seat 23.

Specifically, a pair of right and left installation jigs 7 are located at respective ones of the right and left ends of the support member 2, in a symmetric pattern. In case where the installation jigs 7 are used for a left-hand drive vehicle in which the large-diameter first tubular body 4 is disposed on the left side in the vehicle width direction as illustrated in FIG. 7, the spacer 28 of the installation jigs 7 to be set on the left side of the support member 2 is unfolded rearwardly with respect to the receiving seat 23, and the spacer 28 of the installation jigs 7 to be set on the right side of the support member 2 is superimposed on the receiving seat 23, so that it becomes possible to equally set respective height positions of the right and left installation jigs 7, and support each of the first tubular body 4 located on the side of the driver seat (on the left side) and the second tubular body 5 located on the side of the front passenger seat (on the right side), in a horizontal posture.

On the other hand, in case where the installation jigs 7 are used for a right-hand drive vehicle in which the large-diameter first tubular body 4 is disposed on the right side in the vehicle width direction, the spacer 28 of the installation jigs 7 to be set on the left side of the support member 2 may be swingably displaced frontwardly and superimposed on the receiving seat 23, and the spacer 28 of the installation jigs 7 to be set on the right side of the support member 2 may be swingably displaced rearwardly and unfolded rearwardly with respect to the receiving seat 23. In this manner, the installation jig 7 is configured to be usable for both a left-hand drive vehicle and a right-hand drive vehicle.

The clampable surface portion 25 of the installation jig 7 is composed of a plate-shaped body formed in a predetermined width and located to extend downwardly along a vehicle-width-directional outer surface of a tubular body 30 connected to a lower surface of the support plate 27, while facing in the vehicle front-rear direction.

The clampable surface portion 25 is formed with a positioning hole 32 adapted to allow a guide pin 31 provided on the transfer device 24 to be inserted thereinto, and a rectangular-shaped clamping opening 34 located below the positioning hole 32 and adapted to allow the clamping unit 33 of the transfer device 24 to be engaged therewith.

The clampable surface portion 25 has upper and lower end regions formed, respectively, with two positioning clamp through-holes 35, 36 adapted to allow a positioning clamp provided in a transport carriage (not shown) in a sub-assembly line for combining the dashboard 3 with the support member 2 to sub-assembly the instrument panel module 1, etc., to be engaged therewith.

As illustrated in FIGS. 7 and 8, the fixing base 21 of the installation jig 7 comprises: a support rack 37 provided on the side of a base end of the clampable surface portion 25 to protrude from an upper region of the clampable surface portion 25 in a vehicle rear direction; a locking block 39 slidably supported in a vehicle front-rear direction along a non-illustrated guide groove formed in the support rack 37; a biasing member 40 composed of a compression coil spring to bias the locking block 39 in the vehicle rear direction; and a pushing member 41 adapted to pushing the locking block 39 in a vehicle front direction against the biasing member 40.

The locking block 39 has a slit 42 formed along a lower surface of a distal (rear) end thereof to have a width corresponding to a thickness of the fixable plate 22 of the mounting bracket 6. The distal end of the locking block 39 is further formed with a V-shaped cutout 43 in top plan view.

The cutout 43 is adapted to non-rotatably retain the nut 20 which is to be screwed onto the fixing bolt 19. The support rack 37 is formed with a bolt-insertion hole 44 adapted to allow the fixing bolt 19 for fixing the support rack 37 to the fixable plate 22 to be inserted thereinto.

The pushing member 41 is manually operated to move the locking block 39 frontwardly to a retracted position as indicated by the arrowed line A in FIG. 8. In this state, the pins 8, 9 of the installation jig 7 are inserted into respective ones of the positioning holes 10 (12), 11, so that the receiving seat 23 is brought into contact with the bottom of the support member 2, and the support rack 37 is brought into contact with the lower surface of the fixable plate 22 of the mounting bracket 6.

Then, upon releasing the state of the locking block 39 being manually pushed using the pushing member 41, the locking block 39 is moved rearwardly according to a biasing force of the biasing member 40, so that the lower surface of the distal end of the locking block 39 is brought into contact with and stopped by a stopper (not illustrated), and the fixable plate 22 of the mounting bracket 6 is clamped by the locking block 39 and the support rack 37 from thereabove and therebelow.

Subsequently, the nut 20 is placed on a bolt-insertion hole formed in the fixable plate 22, and retained by the cutout 43 of the locking block 39. In this state, a threaded shank of the fixing bolt 19 is inserted into the bolt-insertion hole 44 of the support rack 37 from therebelow, and screwed with the nut 20, so that the support rack 37 is fixedly fastened to the fixable plate 22 of the mounting bracket 6. In this manner, the installation jig 7 is attached to a predetermined position of a respective one of right and left opposite lateral portions of the support member 2.

The pushing member 41 of the installation jig 7 comprises: a manual operation member 48 made, for example, of a pipe, and configured such that a base end thereof is swingably supported by a support bracket 46 provided at a lower end of the tubular body 30; a drive plate 49 provided at an upper end of the manual operation member 48, and a connection bolt 50 connecting the drive plate 49 to a lateral surface of the locking block 39. The drive plate 49 is formed with an elongate hole 51 extending in an upward-downward direction to permit an upward-downward movement of the connection bolt 50.

The pushing member 41 is configured such that, when the locking block 39 is manually pushed in the direction of the arrowed line A (frontwardly) by gripping the manual operation member 48, the locking block 39 is slidingly displaced to the retracted position, along the upper surface of the support rack 37 against the biasing force of the biasing member 40, to allow the fixable plate 22 of the mounting bracket 6 to be placed on the support rack 37.

Figure 9:
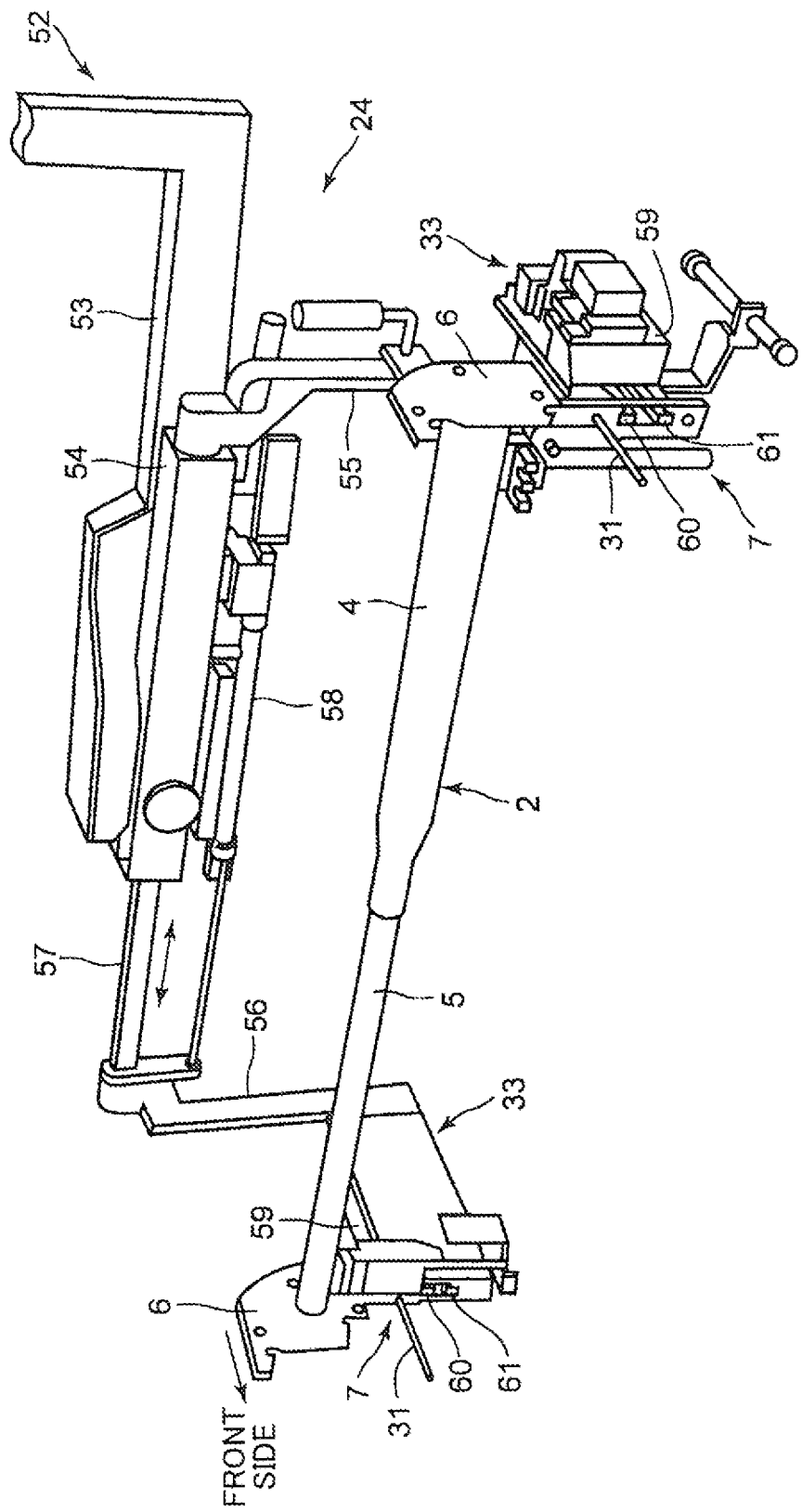
FIG. 9 is a perspective view illustrating a specific configuration of a transfer device.

As illustrated in FIG. 9, the transfer device 24 adapted to transfer the instrument panel module 1 to the front of the passenger compartment comprises; a hanger 52 hung down from a transport rail installed along a main vehicle assembly line, and supported movably in a transport direction of a transport line and directions perpendicular to the transport direction; a holding cylinder 54 attached to a front side surface of a horizontal arm 53 provided at a lower end of the hanger 52 to extend in the vehicle width direction; and a first downwardly-extending member 55 extending downwardly from a base end of the holding cylinder 54. The clamping unit 33 adapted to clamp the clampable surface portion 25 of the installation jig 7 is provided at a lower end of the first downwardly-extending member 55.

A slide bar 57 is slidably installed in the holding cylinder 54 of the transfer device 24, and a second downwardly-extending member 56 is provided at the slide bar 57. Further, a reciprocating actuator 58 is provided just below the holding cylinder 54, and adapted to slidingly displace the slide bar 57 so as to change a protruding length of the slide bar 57 protruding from a distal end of the holding cylinder 54 to adjust a vehicle-widthwise-directional distance between the left and right clamping units 33 located at respective lower ends of the first and second downwardly-extending members 55, 56.

Figure 10:
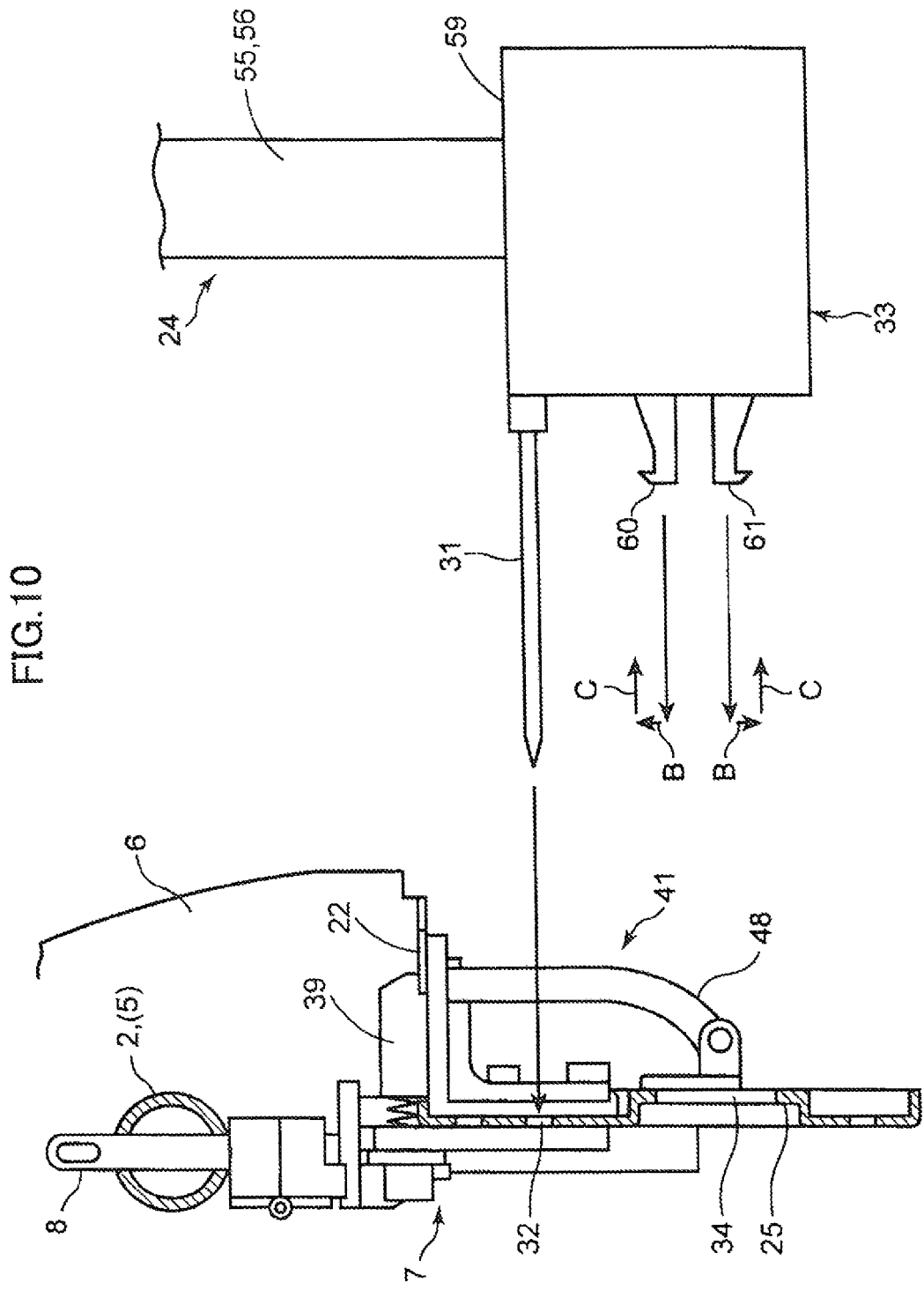
FIG. 10 is a sectional side view illustrating a step of attaching the installation jig.

As illustrated in FIG. 10, the clamping unit 33 of the transfer device 24 comprises: a support box 59 fixed to the lower end of a respective one of the first and second downwardly-extending members 55, 56; a guide pin 31 made of a round bar and provided to protrude from an upper end of a front surface of support box 59; and a pair of upper and lower locking pawls 60, 61 provided below the guide pin 31. The transfer device 24 further comprises distance adjusting means comprised, for example, of a cam mechanism for moving the locking pawls 60, 61 as indicated by the arrowed line B to adjust a distance therebetween, and pull-driving means comprised, for example, of a driving cylinder for moving back respective base ends of the locking pawls 60, 61 as indicated by the arrowed line C to pull the locking pawls 60, 61 into the support box 59. In the two locking pawls 60, 61, the upper locking pawl 60 has a distal end formed with an upwardly-protruding hook portion, and the lower locking pawl 61 has a distal end formed with a downwardly-protruding hook portion.

After attaching the right and left installation jigs 7 to respective ones of the right and left lateral portions of the support member 2, in a clamping step of clamping the clampable surface portion 25 of each of the installation jigs 7 by the clamping unit 33 of the transfer device 24, the instrument panel module 1 supported in a positioned manner on a non-illustrated transport carriage or the like is carried in a vehicle assembly line provided with the transfer device 24.

Then, the distance between the left and right clamping units 33 provided at the lower ends of the first and second downwardly-extending members 55, 56 of the transfer device 24 is adjusted to conform to the distance between the left and right installation jigs 7 attached to the left and right ends of the support member 2. In this state, the hanger 52 of the transfer device 24 is moved frontwardly to insert the distal end of the guide pin 31 provided on each of the clamping units 33, into the positioning hole 32 provided in the clampable surface portion 25 of a respective one of the installation jigs 7, to positionally align the installation jigs 7 with the transfer device 24.

Subsequently, the clamping unit 33 of the transfer device 24 is moved frontwardly to insert the distal ends of the locking pawls 60, 61 into the clamping opening 34 provided in the clampable surface portion 25. Then, the locking pawls 60, 61 are moved in the upward-downward direction to bring the upper locking pawl 60 into contact with an upper edge surface of the clamping opening 34, and bring the lower locking pawl 61 into contact with a lower edge surface of the clamping opening 34.

Figure 11:
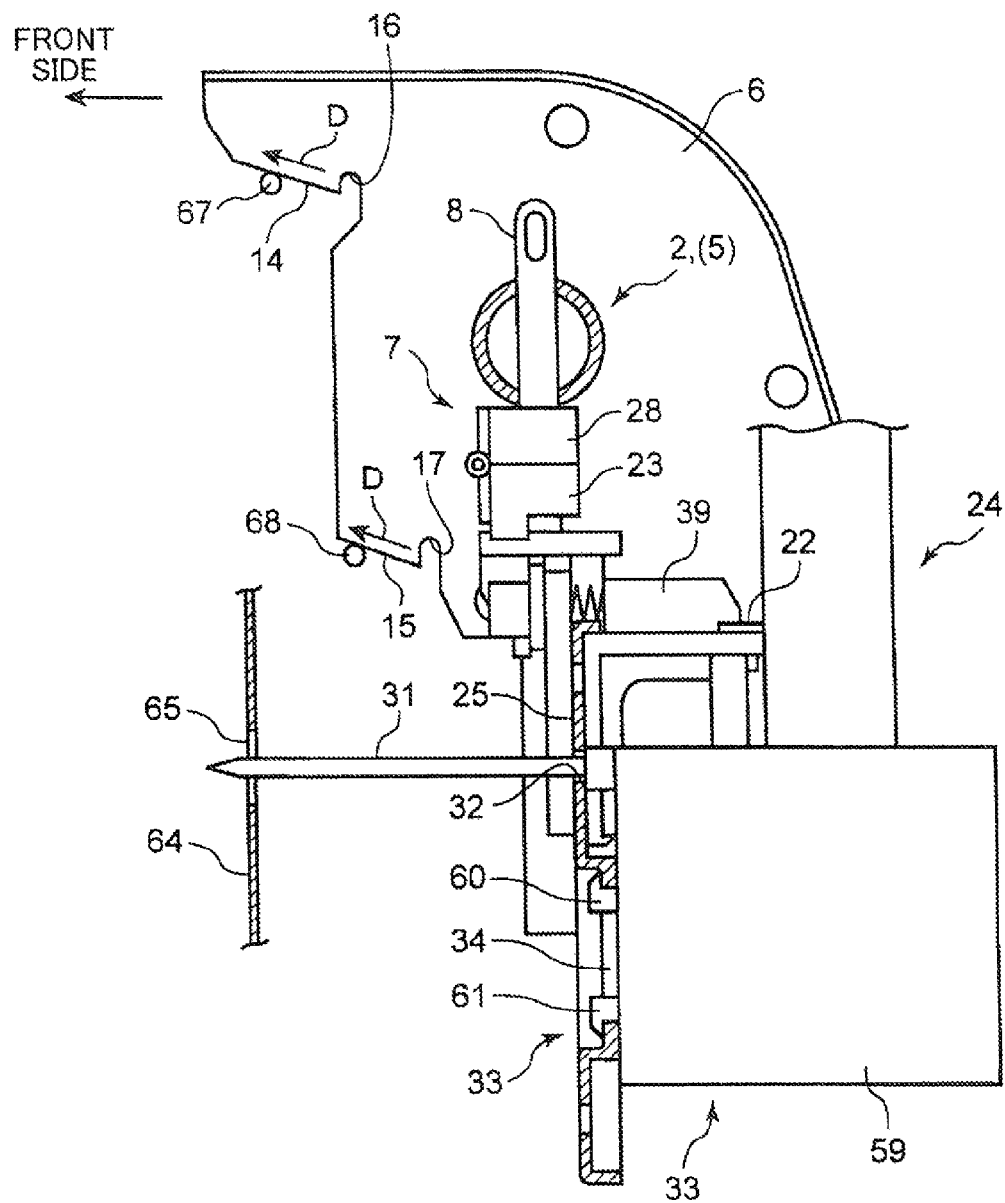
FIG. 11 is a sectional side view illustrating a step of temporarily mounting a mounting bracket.

Then, when the locking pawls 60, 61 are moved back, the hook portions of the locking pawls 60, 61 are brought into engagement with respective upper and lower edges of the clamping opening 34, so that the clampable surface portion 25 is pulled rearwardly and finally brought into contact with the front surface of the support box 59, as illustrated in FIG. 11.

In this manner, the clampable surface portion 25 of the installation jig 7 is locked by the locking pawls 60, 61 of the clamping unit 33. In this state, a rear surface of the clampable surface portion 25 is pressed against and clamped by the front surface of the support box 59, so that the mounting bracket 6 provided at each of the right and left ends of the support member 2 is held by the transfer device 24 through the installation jig 7. Under the condition that the mounting bracket 6 is held by the transfer device 24 in the above manner, the instrument panel module 1 is transferred to an installation position through the transfer device 24.

A method according to one embodiment of the present invention for installing, to a front of a passenger compartment of a vehicle, the instrument panel module 1 comprising the combination of the support member 2 and the dashboard 3, will be described below.

The vehicle instrument panel module installation method comprises: an attaching step of attaching the pair of installation jigs 7 each comprising the upwardly-extending pins 8, 9, the receiving seat 23 and the clampable surface portion 25 facing in the vehicle front-rear direction, to respective ones of the right and left lateral portions of the support member 2; a clamping step of clamping the clampable surface portion 25 of each of the installation jigs 7 by the clamping unit 33 of the transfer device 24; a temporarily mounting step of transferring the instrument panel module 1 to the front of the passenger compartment by the transfer device 24 to temporarily mount each of the right and left mounting brackets 6 to the sidewall of the vehicle body; and a fastening step of, after the temporarily mounting step, fastening each of the right and left mounting brackets 6 in the vehicle width direction by a fastening bolt.

The attachment of the installation jigs 7 to respective ones of the right and left opposite lateral portions of the support member 2 is performed in a sub-assembly line provided separately from a main vehicle assembly line having the temporarily mounting step and the fastening step for the instrument panel module 1.

Specifically, in the sub-assembly line, the dashboard 3 is combined with the support member 2 to sub-assembly the instrument panel module 1. After this step, or in any step in the sub-assembly line before this step, as illustrated in FIG. 8, the pins 8, 9 of the installation jig 7 are inserted into respective ones of the positioning holes 10 (12), 11 of the support member 2 to bring the upper surface of the receiving seat 23 into contact with the bottom of the support member 2, and fixedly fasten the support rack 37 of the installation jig 7 to the fixable plate 22 of the mounting bracket 6 by the fixing bolt 19 and the nut 20 under the condition that the fixable plate 22 of the mounting bracket 6 is clamped by the locking block 39 and the support rack 37 from thereabove and therebelow. In this manner, the installation jigs 7 are attached to the support member 2.

After attaching the installation jigs 7 to respective ones of the right and left opposite lateral portions of the support member 2 in the attaching step, the instrument panel member 1 is transported to the main vehicle assembly line. In the clamping step of the main vehicle assembly line, the clampable surface portion 25 of each of the installation jigs 7 is clamped by the clamping unit 33 of the transfer device 24, and then the instrument panel module 1 is carried in the passenger compartment from a front door opening of the sidewall of the vehicle body while being hung down from the transfer device 24. Subsequently, the instrument panel module 1 is transferred to the front of the passenger compartment by the transfer device 24 to perform an operation for temporarily mounting each of the mounting brackets 6 of the support member 2 to the sidewall of the vehicle body.

In the step of temporarily mounting the mounting bracket 6, as illustrated in FIG. 11, the distal end of the guide pin 31 penetrating through the positioning hole 32 provided in the clampable surface portion 25 is inserted into a guide hole 65 composed of an elongate hole formed in a front wall 64, such as a dash panel, of the passenger compartment, to extend in am upward-downward direction, so that, before temporarily mounting each of the mounting brackets 6 to the sidewall of the vehicle body, the instrument panel module 1 is guided and positioned at least in the vehicle width direction.

For example, the alignment between the mounting bracket 6 and the sidewall of the vehicle body in the vehicle width direction may be performed by slidingly moving a tapered distal end surface of the guide pin 31 along the guide hole 65.

Subsequently, as indicated by the arrowed line D in FIG. 11, the upper and lower guide surfaces 14, 15 formed on the front edge of the mounting bracket 6 are brought into contact with respective ones of the upper and lower support pins 67, 68 provided to protrude from the sidewall of the vehicle body composed, for example, of a base end portion of a hinge pillar, and slidingly moved obliquely upwardly. Then, the support pins 67, 68 are introduced and engaged in the respective ones of the upper and lower locking grooves 16, 17 to positionally align the mounting bracket 6 with the sidewall of the vehicle body (position the mounting bracket 6 with respect to the sidewall of the vehicle body). In this state, the mounting bracket 6 is temporarily mounted to and supported by the support pins 67, 68.

Figure 12:
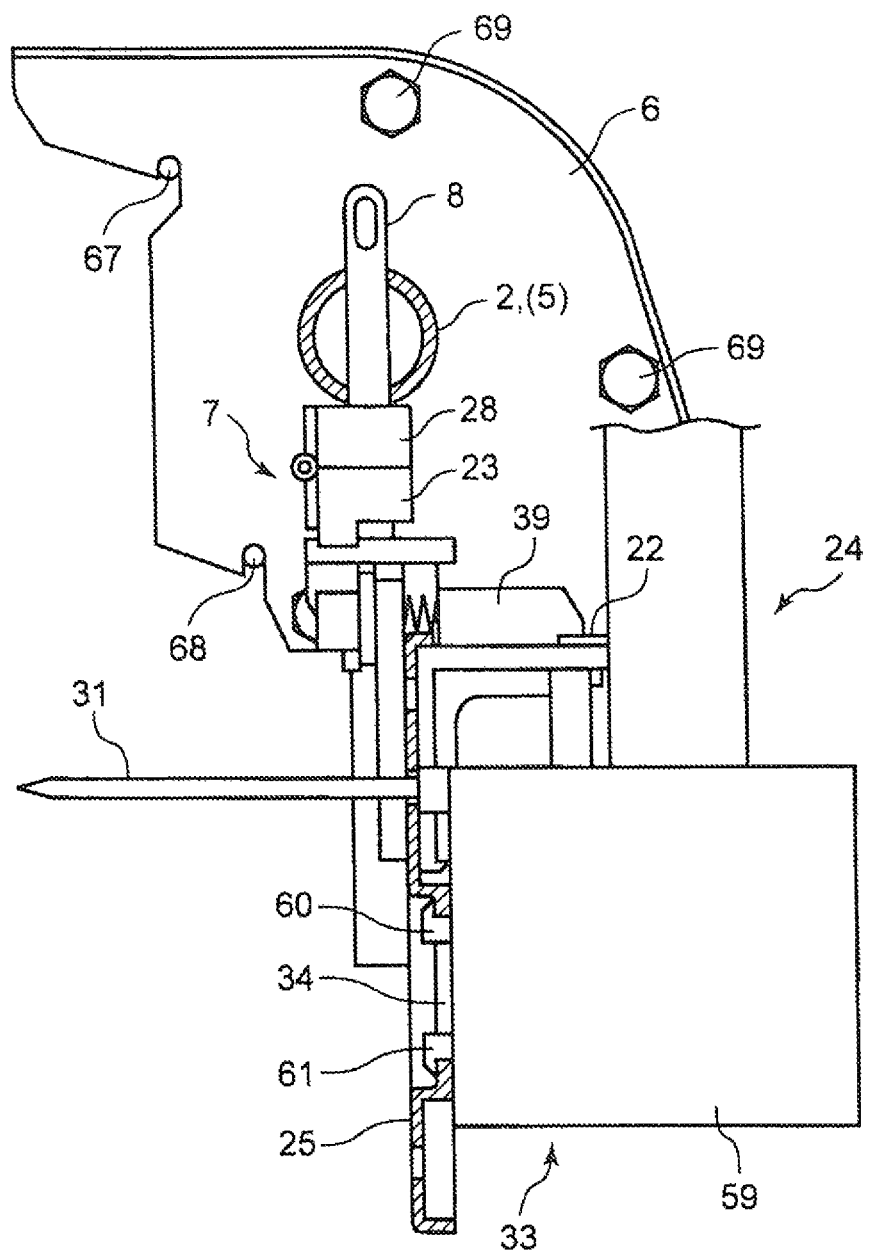
FIG. 12 is a sectional side view illustrating a step of fastening the mounting bracket.

Subsequently, as illustrated in FIG. 12, a fastening step is performed in which the mounting bracket 6 of the support member 2 located on the side of the driver seat is fastened to the sidewall of the vehicle body in the vehicle width direction by the fastening bolt 69, and then, on the basis of the mounting bracket 6 on the side of the driver seat, the mounting bracket 6 of the support member 2 located on the side of the front passenger seat is fastened to the sidewall of the vehicle body in the vehicle width direction by the fastening bolt 69.

Further, the fastened state between the support rack 37 of each of the installation jigs 7 and the clampable surface portion 25 of each of the mounting brackets 6 by means of the fixing bolt 19 and the nut 20 is released to detach the installation jigs 7 from the support member 2. The operation for fastening the mounting brackets 6 by the fastening bolts 69 may be performed after detaching the installation jigs 7 from the support member 2. The installation jigs 7 detached from the support member 2 will be re-used for subsequent operations for installing the instrument panel module 1.

As above, the vehicle instrument panel module installation method for installing, to a front of a passenger compartment of a vehicle, an instrument panel module 1 comprising a combination of a support member 2 extending in a vehicle width direction and a dashboard 3, comprises: an attaching step of attaching a pair of installation jigs 7, respectively, to right and left opposite lateral portions of the support member 2, wherein: the support member 2 has right and left mounting brackets 6 provided, respectively, at right and left opposite ends thereof, and right and left positioning holes each formed as two holes 10, 11 at positions located on the side of a bottom thereof and inward of a respective one of the right and left mounting brackets 6 in the vehicle width direction; and each of the installation jigs 7 comprises two upwardly-extending pins 8, 9 each adapted to be inserted into a corresponding one of the two positioning holes, a receiving seat 23 for the support member 2, and a clampable surface portion 25 facing in a vehicle front-rear direction; a clamping step of clamping the clampable surface portion 25 of each of the installation jigs 7 by a clamping unit 33 of a transfer device 24; a temporarily mounting step of transferring the instrument panel module 1 to the front of the passenger compartment by the transfer device 24 to temporarily mount each of the right and left mounting brackets 6 to a sidewall of a vehicle body; and a fastening step of, after the temporarily mounting step, detaching the installation jigs 7 from the support member 2, and fastening each of the right and left mounting brackets to the sidewall of the vehicle body in the vehicle width direction by a fastening bolt. This method makes it possible to perform the operation for installing, to the front of the passenger compartment of the vehicle, the instrument panel module 1 comprising the combination of the support member 2 extending in the vehicle width direction and the dashboard 3, to be performed easily and adequately without employing a means to form openings in the dashboard 3, etc.

Specifically, in the above embodiment, the pins 8, 9 protruding upwardly from the receiving seat 23 of each of the installation jigs 7 are inserted into respective ones of the positioning pins 10 (12), 11 of the support member 2 from therebelow to bring the upper surface of the receiving seat 23 into contact with the bottom of the support member 2. In this state, the support rack 37 of each of the installation jigs 7 is fastened to the clampable surface portion 25 of each of the mounting brackets 6 to attach the installation jigs 7 to the support member 2. This makes it possible to attach the installation jigs 7 on a bottom side of the support member 2 while accurately positioning each of the installation jigs 7 at a position inward in the vehicle width direction with respect to each of the mounting brackets 6 provided at the respective ones of the right and left ends of the support member 2.

Thus, it becomes possible to perform the operation for carrying the instrument panel module 1 in the passenger compartment and installing the instrument panel module 1 to the front of the passenger compartment, using the transfer device 24, while clamping the clampable surface portion 25 of each of the installation jigs 7 by the clamping unit 33 of the transfer device 24, easily and adequately, without employing a means, for example, configured such that a clampable portion to be clamped by the clamping unit 33 of the transfer device 24 is provided to protrude in a vehicle rear direction through an opening formed in a dashboard 3.

This eliminates a complicate operation of covering the above opening or the like by a cover member after completion of the operation for installing the instrument panel module 1, so that it becomes possible to perform the operation for installing the instrument panel module 1 to the vehicle, easily and adequately.

In the above embodiment, the front wall 64 of the passenger compartment of the vehicle is formed with the guide hole 65 penetrating therethrough in the vehicle front-rear direction, and the transfer device 24 for transferring the support member 2 to the front of the passenger compartment is provided with the guide pin 31 adapted to be inserted into the guide hole 65 during the course where the clampable surface portion 25 of each of the installation jigs 7 is transferred toward the front end of the vehicle while being clamped by the clamping unit 33. Thus, before temporarily mounting each of the mounting brackets 6 of the support member 2 to the sidewall of the vehicle body, the guide pin 31 is inserted into the guide hole 65 to allow the instrument panel module 1 to be guided and positioned at least in the vehicle width direction, so that it becomes possible to position the instrument panel module 1 with respect to the sidewall of the vehicle body in the vehicle width direction, easily and adequately, through the use of the guide pin 31 provided for positionally aligning each of the installation jigs with the transfer device 24. This provides an advantage of being able to perform the temporarily mounting operation and the fastening operation for each of the mounting brackets to the sidewall of the vehicle body, adequately with a simple configuration.

In the above embodiment, each of the installation jigs 7 is attached to the support member by providing he two positioning holes 10, 11 in a bottom of each of the first and second tubular bodies 4, 5 constituting the support member 2, and bringing the two pins 8, 9 provided on each of the installation jigs, into engagement with respective ones of the positioning holes 10, 11. This provides an advantage of being able to adequately attach each of the installation jigs 7 to the support member 2 while sufficiently maintaining strength of the support member 2 and accurately positioning the installation jig 7 with respect to the support member 2, and stably maintain the attached state.

In the above embodiment, the instrument panel module 1 is installed to the sidewall of the vehicle body in a specific stage of the main vehicle assembly line, and a sub-assembling operation for combining the dashboard 3 with the support member 2 is performed in a sub-assembly line provided separately from the main vehicle assembly line, wherein the installation jigs 7 are attached to the support member 2 in one of a plurality of steps of the sub-assembly line. This makes it possible to utilize the installation jigs 7 as a positioning clamping member provided in a transport carriage in the sub-assembly line, and facilitate effective utilization of the installation jigs 7.

Instead of the above embodiment configured such that, after attaching the installation jigs 7 to the support member 2, the clampable surface portion 25 provided in each of the installation jigs 7 is clamped by the clamping unit 33 of the transfer device 24, the installation jigs 7 may be attached to the support member 2 by attaching the installation jigs 7 to the transfer device 24 while clamping the clampable surface portion 25 of each of the installation jigs 7 by the clamping unit 33 of the transfer device 24, and then bringing the pins 8, 9 of the installation jig 7 into engagement with respective ones of the positioning holes 10, 11 of the support member 2.

In this case, it is possible to maintain a coupling state between the support member 2 and the installation jig 7 based on a weight of the support member itself, while omitting the fixing bolt 9 and the nut 20 for fastening the support rack 37 of each of the installation jigs 7 to the fixable plate 22 of each of the mounting brackets 6.

Summary of Aforementioned Embodiment

According to one aspect of the present invention, there is provided a vehicle instrument panel module installation method for installing, to a front of a passenger compartment of a vehicle, an instrument panel module 1 comprising a combination of a support member 2 extending in a vehicle width direction and a dashboard 3. The method comprises: an attaching step of attaching a pair of installation jigs 7, respectively, to right and left opposite lateral portions of the support member 2, wherein: the support member 2 has right and left mounting brackets 6 provided, respectively, at right and left opposite ends thereof, and right and left positioning holes 10, 11 each formed at a position located on the side of a bottom thereof and inward of a respective one of the right and left mounting brackets 6 in the vehicle width direction; and each of the installation jigs 7 comprises an upwardly-extending pin 8, 9 adapted to be inserted into a corresponding one of the right and left positioning holes, a receiving seat 23 for the support member 2, and a clampable surface portion 25 facing in a vehicle front-rear direction; a clamping step of clamping the clampable surface portion 25 of each of the installation jigs 7 by a transfer device 24 having a clamping unit 33; a temporarily mounting step of transferring the instrument panel module 1 to the front of the passenger compartment by the transfer device 24 to temporarily mount each of the right and left mounting brackets 6, 6 to a sidewall of a vehicle body; and a fastening step of, after the temporarily mounting step, detaching the installation jigs 7 from the support member 2, and fastening each of the right and left mounting brackets to the sidewall of the vehicle body in the vehicle width direction by a fastening bolt 69.

The method of the present invention makes it possible to perform the operation for carrying the instrument panel module 1 in the passenger compartment and temporarily mounting each of the mounting brackets 6 to the sidewall of the vehicle body, using the transfer device 24, while clamping the clampable surface portion 25 of each of the installation jigs 7 by the transfer device 24, easily and adequately. This eliminates a need for forming an opening or the like in a dashboard in order to provide a clampable portion to be clamped by a clamping unit of the transfer device as in an conventional technique.

Preferably, in the vehicle instrument panel module installation method of the present invention, a front wall of the passenger compartment of the vehicle is formed with a guide hole 65 penetrating therethrough in the vehicle front-rear direction, and the transfer device 24 is provided with a guide pin 31 adapted to be inserted into the guide hole 65 during a course where the clampable surface portion 25 is transferred toward a front end of the vehicle while being clamped by the clamping unit 33, wherein, before temporarily mounting each of the right and left mounting brackets 6 to the sidewall of the vehicle body, the guide pin 31 is inserted into the guide hole 65 to allow the instrument panel module 1 to be guided and positioned at least in the vehicle width direction.

This feature makes it possible to position the instrument panel module 1 with respect to the sidewall of the vehicle body in the vehicle width direction, easily and adequately, which provides an advantage of being able to perform the temporarily mounting operation and the fastening operation for each of the mounting brackets to the sidewall of the vehicle body, adequately with a simple configuration.

Preferably, in the vehicle instrument panel module installation method of the present invention, the support member 2 has a tubular body 4, 5, wherein two positioning holes 10, 11 are formed in a bottom of tubular body, and two upwardly-extending pin 8, 9 are provided on each of the installation jigs 7, and wherein the attaching step includes bringing the two upwardly-extending pins 8, 9 into engagement with respective ones of the two positioning holes 10, 11, whereby each of the installation jigs 7 is positioned with respect to the support member 2.

This feature provides an advantage of being able to adequately attach each of the installation jigs 7 to the support member 2 while sufficiently maintaining strength of the support member 2 and accurately positioning the installation jig 7 with respect to the support member 2, and stably maintain the attached state.

More preferably, in the above vehicle instrument panel module installation method, each of the right and left mounting brackets 6 is provided with a fixable plate 22, and each of the installation jigs 7 is provided with a fixing base 21 engageable with the fixable plate 22, wherein the attaching step includes fixing the fixable plate 22 to the fixing base 21 by a fastening member 19, 20, while bringing the two upwardly-extending pins 8, 9 into engagement with respective ones of the two positioning holes 10, 11.

This feature makes it possible to maintain the attached state of the installation jigs 7 to the instrument panel module 1 more accurately and stably.

Preferably, in the vehicle instrument panel module installation method of the present invention, the sidewall of the vehicle body is provided with a support pin 67, 68 protruding inwardly in the vehicle width direction, and each of the right and left mounting brackets 6 has a guide surface 14, 15 inclined obliquely upwardly and frontwardly and slidable with an upper portion of the support pin, and a locking groove 16, 17 formed at a base end of the guide surface as an upward concave portion, wherein, when the instrument panel module 1 is transferred toward the front of the passenger compartment in the temporarily mounting step, the guide surface of each of the right and left mounting brackets 6 is slidingly moved along the upper portion of the support pin, and the support pin 67, 68 is engaged with and locked in the concave portion 16, 17 of the guide surface 14, 15, whereby a relative position between the instrument panel module 1 and the sidewall of the vehicle body in the vehicle front-rear direction is set up.

This feature provides an advantage of being able to perform the temporarily mounting operation and the fastening operation for each of the instrument panel module 1 to the sidewall of the vehicle body, more adequately with a simple configuration.

Preferably, in the vehicle instrument panel module installation method of the present invention, the instrument panel module 1 is installed to the sidewall of the vehicle body in a specific stage of a main vehicle assembly line, and a sub-assembling operation for combining the dashboard with the support member is performed in a sub-assembly line provided separately from the main vehicle assembly line, and wherein the installation jigs are attached to the support member in one of a plurality of steps of the sub-assembly line.

The main vehicle assembly line and the sub-assembly line may be configured in the above manner. This provides an advantage of being able to utilize the installation jigs 7 as a positioning clamping member provided in a transport carriage in the sub-assembly line, and facilitate effective utilization of the installation jigs 7.

This application is based on Japanese Patent Application Serial No. 2011-021734 filed in Japan Patent Office on Feb. 3, 2011, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A vehicle instrument panel module installation method for installing, to a front of a passenger compartment of a vehicle, an instrument panel module comprising a combination of a support member extending in a vehicle width direction and a dashboard, the method comprising:
   an attaching step of attaching a pair of installation jigs, respectively, to right and left opposite lateral portions of the support member, wherein: the support member has right and left mounting brackets provided, respectively, at right and left opposite ends thereof, and right and left positioning holes each formed in a bottom of the support member located inward of a respective one of the right and left mounting brackets in the vehicle width direction; and each of the installation jigs has an upwardly-extending pin adapted to be inserted into a corresponding one of the right and left positioning holes, a receiving seat for the support member, and a clampable surface portion facing in a vehicle front-rear direction;
   a clamping step of clamping the clampable surface portion of each of the installation jigs by a transfer device having a clamping unit operable to approach the clampable portion in the front-rear direction for clamping;
   a temporarily mounting step of transferring the instrument panel module to the front of the passenger compartment by the transfer device to temporarily mount each of the right and left mounting brackets to a sidewall of a vehicle body; and
   a fastening step of, after the temporarily mounting step, detaching the installation jigs from the support member, and fastening each of the right and left mounting brackets to the sidewall of the vehicle body in the vehicle width direction by a fastening bolt.

2. The vehicle instrument panel module installation method as defined in claim 1, wherein a front wall of the passenger compartment of the vehicle is formed with a guide hole penetrating therethrough in the vehicle front-rear direction, and the transfer device is provided with a guide pin adapted to be inserted into the guide hole during a course where the clampable surface portion is transferred toward a front end of the vehicle while being clamped by the clamping unit, and wherein, before temporarily mounting each of the right and left mounting brackets to the sidewall of the vehicle body, the guide pin is inserted into the guide hole to allow the instrument panel module to be guided and positioned at least in the vehicle width direction.

3. The vehicle instrument panel module installation method as defined in claim 2, wherein the support member has a tubular body, and wherein two positioning holes are formed in a bottom of tubular body, and two upwardly-extending pins are provided on each of the installation jigs, and wherein the attaching step includes bringing the two upwardly-extending pins into engagement with respective ones of the two positioning holes, whereby each of the installation jigs is positioned with respect to the support member.

4. The vehicle instrument panel module installation method as defined in claim 3, wherein each of the right and left mounting brackets is provided with a fixable plate, and each of the installation jigs is provided with a fixing base engageable with the fixable plate, and wherein the attaching step includes fixing the fixable plate to the fixing base by a fastening member, while bringing the two upwardly-extending pins into engagement with respective ones of the two positioning holes.

5. The vehicle instrument panel module installation method as defined in claim 4, wherein the sidewall of the vehicle body is provided with a support pin protruding inwardly in the vehicle width direction, and each of the right and left mounting brackets has a guide surface inclined obliquely upwardly and frontwardly and slidable with an upper portion of the support pin, and a locking groove formed at a base end of the guide surface as an upward concave portion, and wherein, when the instrument panel module is transferred toward the front of the passenger compartment in the temporarily mounting step, the guide surface of each of the right and left mounting brackets is slidingly moved along the upper portion of the support pin, and the support pin is engaged with and locked in the concave portion of the guide surface, whereby a relative position between the instrument panel module and the sidewall of the vehicle body in the vehicle front-rear direction is set up.

6. The vehicle instrument panel module installation method as defined in claim 5, wherein the instrument panel module is installed to the sidewall of the vehicle body in a specific stage of a main vehicle assembly line, and a sub-assembling operation for combining the dashboard with the support member is performed in a sub-assembly line provided separately from the main vehicle assembly line, and wherein the installation jigs are attached to the support member in one of a plurality of steps of the sub-assembly line.

7. The vehicle instrument panel module installation method as defined in claim 3, wherein the sidewall of the vehicle body is provided with a support pin protruding inwardly in the vehicle width direction, and each of the right and left mounting brackets has a guide surface inclined obliquely upwardly and frontwardly and slidable with an upper portion of the support pin, and a locking groove formed at a base end of the guide surface as an upward concave portion, and wherein, when the instrument panel module is transferred toward the front of the passenger compartment in the temporarily mounting step, the guide surface of each of the right and left mounting brackets is slidingly moved along the upper portion of the support pin, and the support pin is engaged with and locked in the concave portion of the guide surface, whereby a relative position between the instrument panel module and the sidewall of the vehicle body in the vehicle front-rear direction is set up.

8. The vehicle instrument panel module installation method as defined in claim 7, wherein the instrument panel module is installed to the sidewall of the vehicle body in a specific stage of a main vehicle assembly line, and a sub-assembling operation for combining the dashboard with the support member is performed in a sub-assembly line provided separately from the main vehicle assembly line, and wherein the installation jigs are attached to the support member in one of a plurality of steps of the sub-assembly line.

9. The vehicle instrument panel module installation method as defined in claim 2, wherein the sidewall of the vehicle body is provided with a support pin protruding inwardly in the vehicle width direction, and each of the right and left mounting brackets has a guide surface inclined obliquely upwardly and frontwardly and slidable with an upper portion of the support pin, and a locking groove formed at a base end of the guide surface as an upward concave portion, and wherein, when the instrument panel module is transferred toward the front of the passenger compartment in the temporarily mounting step, the guide surface of each of the right and left mounting brackets is slidingly moved along the upper portion of the support pin, and the support pin is engaged with and locked in the concave portion of the guide surface, whereby a relative position between the instrument panel module and the sidewall of the vehicle body in the vehicle front-rear direction is set up.

10. The vehicle instrument panel module installation method as defined in claim 9, wherein the instrument panel module is installed to the sidewall of the vehicle body in a specific stage of a main vehicle assembly line, and a sub-assembling operation for combining the dashboard with the support member is performed in a sub-assembly line provided separately from the main vehicle assembly line, and wherein the installation jigs are attached to the support member in one of a plurality of steps of the sub-assembly line.

11. The vehicle instrument panel module installation method as defined in claim 1, wherein the sidewall of the vehicle body is provided with a support pin protruding inwardly in the vehicle width direction, and each of the right and left mounting brackets has a guide surface inclined obliquely upwardly and frontwardly and slidable with an upper portion of the support pin, and a locking groove formed at a base end of the guide surface as an upward concave portion, and wherein, when the instrument panel module is transferred toward the front of the passenger compartment in the temporarily mounting step, the guide surface of each of the right and left mounting brackets is slidingly moved along the upper portion of the support pin, and the support pin is engaged with and locked in the concave portion of the guide surface, whereby a relative position between the instrument panel module and the sidewall of the vehicle body in the vehicle front-rear direction is set up.

12. The vehicle instrument panel module installation method as defined in claim 11, wherein the instrument panel module is installed to the sidewall of the vehicle body in a specific stage of a main vehicle assembly line, and a sub-assembling operation for combining the dashboard with the support member is performed in a sub-assembly line provided separately from the main vehicle assembly line, and wherein the installation jigs are attached to the support member in one of a plurality of steps of the sub-assembly line.

13. A vehicle instrument panel module installation method for installing, to a front of a passenger compartment of a vehicle, an instrument panel module comprising a combination of a support member extending in a vehicle width direction and a dashboard, the method comprising:

an attaching step of attaching a pair of installation jigs, respectively, to right and left opposite lateral portions of the support member, wherein: the support member has right and left mounting brackets provided, respectively, at right and left opposite ends thereof, and right and left positioning holes each formed at a position located in a bottom of the support member located inward of a respective one of the right and left mounting brackets in the vehicle width direction; and each of the installation jigs has an upwardly-extending pin adapted to be inserted into a corresponding one of the right and left positioning holes, a receiving seat for the support member, and a clampable surface portion facing in a vehicle front-rear direction;

a clamping step of clamping the clampable surface portion of each of the installation jigs by a transfer device having a clamping unit operable to approach the clampable portion in the front-rear direction for clamping;

a temporarily mounting step of transferring the instrument panel module to the front of the passenger compartment by the transfer device to temporarily mount each of the right and left mounting brackets to a sidewall of a vehicle body; and a fastening step of, after the temporarily mounting step, detaching the installation jigs from the support member, and fastening each of the right and left mounting brackets to the sidewall of the vehicle body in the vehicle width direction by a fastening bolt, wherein the support member has a tubular body, and wherein two positioning holes are formed in a bottom of tubular body, and two upwardly-extending pins are provided on each of the installation jigs, and wherein the attaching step includes bringing the two upwardly-extending pins into engagement with respective ones of the two positioning holes, whereby each of the installation jigs is positioned with respect to the support member.

14. The vehicle instrument panel module installation method as defined in claim 13, wherein each of the right and left mounting brackets is provided with a fixable plate, and each of the installation jigs is provided with a fixing base engageable with the fixable plate, and wherein the attaching step includes fixing the fixable plate to the fixing base by a fastening member, while bringing the two upwardly-extending pins into engagement with respective ones of the two positioning holes.

15. The vehicle instrument panel module installation method as defined in claim 14, wherein the sidewall of the vehicle body is provided with a support pin protruding inwardly in the vehicle width direction, and each of the right and left mounting brackets has a guide surface inclined obliquely upwardly and frontwardly and slidable with an upper portion of the support pin, and a locking groove formed at a base end of the guide surface as an upward concave portion, and wherein, when the instrument panel module is transferred toward the front of the passenger compartment in the temporarily mounting step, the guide surface of each of the right and left mounting brackets is slidingly moved along the upper portion of the support pin, and the support pin is engaged with and locked in the concave portion of the guide surface, whereby a relative position between the instrument panel module and the sidewall of the vehicle body in the vehicle front-rear direction is set up.

16. The vehicle instrument panel module installation method as defined in claim 15, wherein the instrument panel module is installed to the sidewall of the vehicle body in a specific stage of a main vehicle assembly line, and a sub-assembling operation for combining the dashboard with the support member is performed in a sub-assembly line provided separately from the main vehicle assembly line, and wherein the installation jigs are attached to the support member in one of a plurality of steps of the sub-assembly line.

* * * * *